US012635005B2

(12) United States Patent
Lu

(10) Patent No.: US 12,635,005 B2
(45) Date of Patent: May 19, 2026

(54) ESTABLISHMENT CAUSE FOR EXTENDED REALITY APPLICATIONS VIA TELECOMMUNICATION NETWORK

(71) Applicant: T-Mobile USA, Inc., Bellevue, WA (US)

(72) Inventor: Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 607 days.

(21) Appl. No.: 18/100,431

(22) Filed: Jan. 23, 2023

(65) Prior Publication Data

US 2024/0251455 A1 Jul. 25, 2024

(51) Int. Cl.
*H04W 76/10* (2018.01)
*H04W 68/00* (2009.01)

(52) U.S. Cl.
CPC ......... *H04W 76/10* (2018.02); *H04W 68/005* (2013.01)

(58) Field of Classification Search
CPC ............................ H04W 76/10; H04W 68/005
See application file for complete search history.

(56) References Cited

U.S. PATENT DOCUMENTS 10,880,868 B2 12/2020 Adjakple et al.
11,102,807 B2 8/2021 Shaheen 2019/0174394 A1* 6/2019 Lu .......................... H04W 72/56
2022/0095313 A1 3/2022 Kim et al.
2024/0147477 A1* 5/2024 Rao ....................... H04W 72/20

FOREIGN PATENT DOCUMENTS

EP 3917218 A1 12/2021
WO WO2022192780 A1 9/2022

OTHER PUBLICATIONS

ETSI TR 126 928 , "5G; Extended Reality (XR) in 5G (3GPP TR 26.928 version 17.0.0 Release 17)", available at <<https://www.etsi.org/deliver/etsi_tr/126900_126999/126928/17.00.00_60/tr_126928v170000p.pdf>>, May 2022, 133 pages.
ETSI TS 136 331 , "LTE; Evolved Universal Terrestrial Radio Access (E-UTRA); Radio Resource Control (RCC); Protocol specification (3GPP TS 36.331 version 17.0.0 Release 17)", available at <<https://www.etsi.org/deliver/etsi_ts/136300_136399/136331/17.00.00_60/ts_136331v170000p.pdf>>, May 2022, 1126 pages.

(Continued)

*Primary Examiner* — Sulaiman Nooristany
(74) *Attorney, Agent, or Firm* — Lee & Hayes, P.C.

(57) ABSTRACT

A user equipment (UE) can connect to a base station of a telecommunication network by sending a Radio Resource Control (RRC) connection request to the base station. When the UE engages in a virtual reality (VR) application, augmented reality (AR) application, or any other Extended Reality (XR) application via the telecommunication network, the UE can indicate a XR establishment cause within an RRC connection request sent to a base station. The base station can determine, based on the XR establishment cause in the RRC connection request, that the UE will be engaging in an XR application, and can set up bearers and/or otherwise allocate resources for an RRC connection that are associated with latency goals, throughput goals, and/or other target goals associated with XR applications.

20 Claims, 6 Drawing Sheets

(56)         References Cited

OTHER PUBLICATIONS

ETSI TS 138 331 , "5G; NR; Radio Resource Control (RRC);
Protocol specification (3GPP TS 38.221 version 17.0.0 Release
17)", available at <<https://www.etsi.org/deliver/etsi_ts/138300_
138399/138331/17.00.00_60/ts_138331v170000p.pdf>>, May 2022,
1197 pages.
Search Report for European Application No. 24153157.3, Dated
Jun. 21, 2024, 11 pages.

* cited by examiner

300

400

500

Receive RRC Connection Request,
Including XR Establishment Cause,
From UE
502

Resources
Available for
RRC Connection
Associated with XR?
504

Y

N

Set Up RRC Connection Associated
with XR
508

Reject RRC Connection Request
506

Send RRC Connection Setup
Response(s) to UE
510

Exchange XR Application Data with UE
512

ESTABLISHMENT CAUSE FOR EXTENDED REALITY APPLICATIONS VIA TELECOMMUNICATION NETWORK

BACKGROUND

In a telecommunication network, a user equipment (UE) can wirelessly connect to one or more base stations in order to engage in voice calls, video calls, data transfers, or other types of communications. For example, a UE can wirelessly connect to one or more gNBs or other base stations of a radio access network (RAN) to access the telecommunication network.

In some examples, a UE may use a connection to the telecommunication network to engage in services associated with Extended Reality (XR) applications, such as virtual reality (VR) applications, augmented reality (AR) applications, and/or mixed reality (MR) applications. For instance, the UE may be a VR headset, an AR headset, a smartphone, or another computing device that can send and receive data via the telecommunication network to engage in one or more types of XR applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
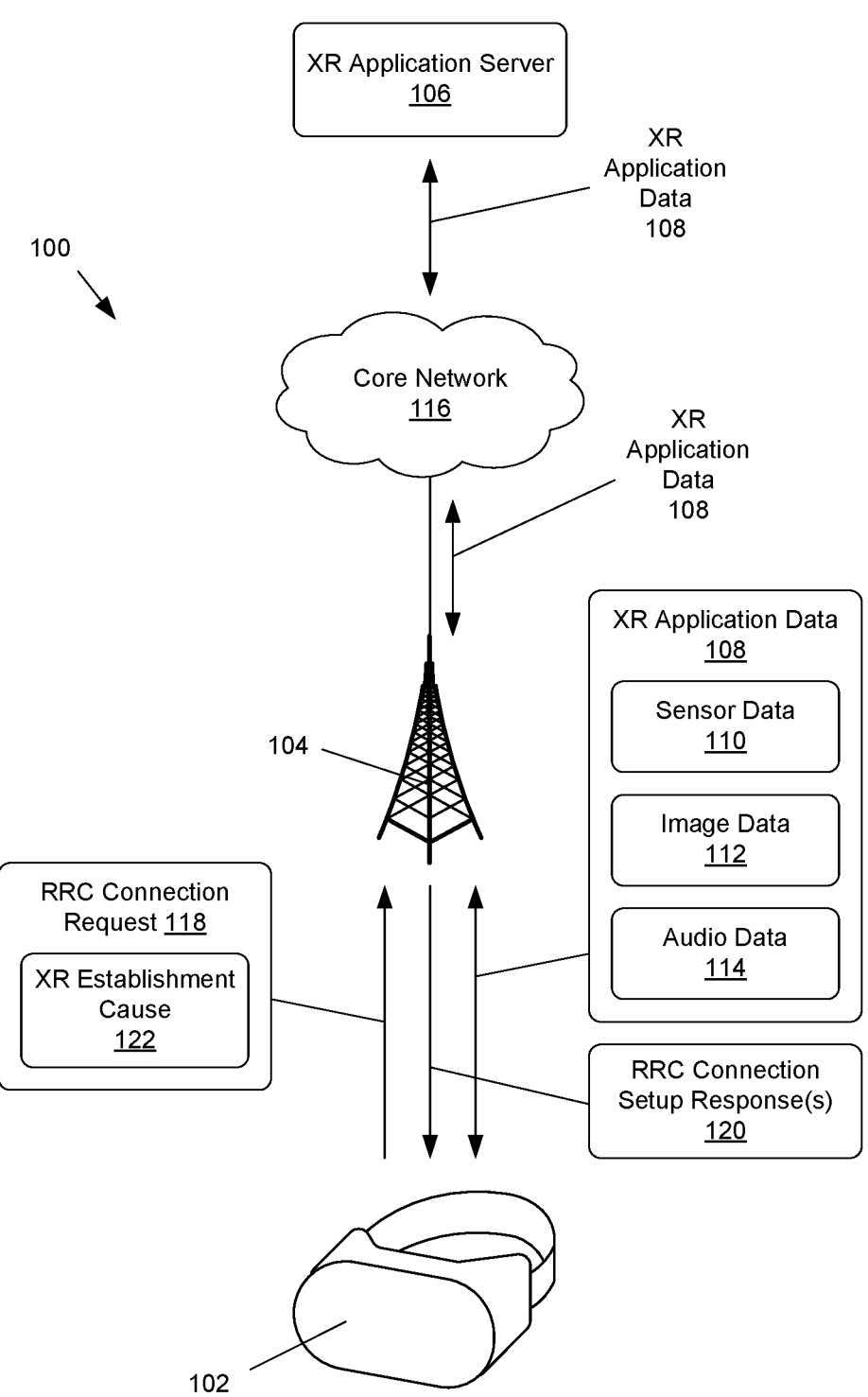
FIG. 1 shows an example of a network environment in which a UE can connect to a telecommunication network via at least one base station, to engage in a communication session associated with an Extended Reality (XR) application.

A UE can wirelessly connect to a base station of a telecommunication network, such as a gNB of a fifth generation (5G) New Radio (NR) radio access network. When connected to the base station, the UE can send uplink data to the base station and receive downlink data from the base station.

The UE can be a virtual reality (VR) headset, an augmented reality (AR) headset, a smartphone, or any other type of computing device that can engage in one or more types of XR applications via a connection to the telecommunication network. For example, the UE can be an XR headset that connects to a base station of the telecommunication network directly, or via a tethering connection or other type of connection to a smartphone, router, or other device that wirelessly connects to a base station of the telecommunication network.

XR applications can include VR applications that may immerse a user in a representation of a virtual environment. XR applications can also include AR and/or mixed reality (MR) applications that overlay information, virtual items, and/or other content over a representation of a real environment.

Some XR applications can be at least partially executed via servers or other computing devices that are remote from the UE. For instance, a VR headset may send positioning data associated with movement of the VR headset to a remote server via the telecommunication network. The remote server can render images of a virtual environment based on the positioning data provided by the VR headset, and can send the rendered images over the telecommunication network to the VR headset such that the VR headset can display the rendered images to a user. Accordingly, the VR headset can avoid using local computing resources to render images associated with the virtual environment, and can instead present the images that were rendered remotely by the server.

XR applications may provide the best user experiences when corresponding data can be transmitted over the telecommunication network with low latencies, at high throughputs, and/or in compliance with other target goals associated with XR applications. Similarly, XR applications may provide poorer user experiences when corresponding data is transmitted over the telecommunication network with higher latencies, at lower throughputs, and/or otherwise not in compliance with target goals associated with XR applications.

For example, if network latencies cause delays in transmission of positioning data from a VR headset to a remote server and/or delays in transmission of corresponding image data returned from the remote server to the VR headset, there may be a user-perceptible delay between movements of the VR headset and corresponding changes in the images presented by the VR headset to the user. Such a user-perceptible delay may cause the user of the VR headset to experience motion sickness and/or other negative effects. Similarly, if the framerate and/or resolution of images returned by the remote server are limited due to network latencies and/or available throughput, low framerates and/or low resolutions of the images may similarly cause the user of the VR headset to experience motion sickness and/or other negative effects. However, if data associated with an XR application can be transmitted over the telecommunication network with lower latencies and/or at higher throughputs, such that delays between inputs and corresponding displays of content are minimized and images are presented at high framerates and/or high resolutions, a user of the XR application may have a better user experience and be less likely to experience motion sickness or other negative effects.

However, in many existing systems, elements of the telecommunication network may not be able to determine when connections are being set up to transmit data associated with XR applications. Accordingly, the telecommunication network may handle data associated with an XR application as if the data is a generic type of data that is not associated with low latency goals, high throughput goals, or other target goals associated with XR applications.

For example, when a UE engages in an XR application via a telecommunication network, the UE may send a Radio Resource Control (RRC) connection request to a base station that prompts the base station to set up an RRC connection that can be used to transmit data associated with the XR application. The RRC connection request may indicate an establishment cause associated with a reason for the RRC connection, for instance as a value of an "establishment-Cause" field of the RRC connection request. However, possible values of the "establishmentCause" field in existing systems, such as "emergency," "highPriority Access," "mt-Access," "mo-Data," "mo-VoiceCall," "mo-VideoCall," and "mo-SMS," may not signify the unique parameters and/or target goals associated with XR applications.

For example, in existing systems a UE may default to using the "mo-Data" establishment cause in an RRC connection request when the UE requests an RRC connection for data associated with an XR application. However, the "mo-Data" establishment cause may normally be associated with general types of data, such as web browsing data or other types of data, that may be associated with best-effort service and that are not associated with latency and/or throughput goals. Accordingly, the "mo-Data" establishment cause may prompt the receiving base station to transmit corresponding data over default or low-priority bearers, and the data may thus be transmitted with high latencies and/or with low throughput that can negatively impact user experiences with the XR application as described above.

Other existing establishment cause values may similarly be insufficient for use in association with XR applications. For instance, inclusion of the "mo-VoiceCall" establishment cause in an RRC connection may indicate to a base station that corresponding data will be for real-time voice calls, and thus should be prioritized by the base station to reduce latencies associated with transmission of the data that might otherwise impact the real-time voice calls. However, although the "mo-VoiceCall" establishment cause may indicate relatively low latency targets, such latency targets may still be too high for XR applications because voice calls may tolerate higher latencies than XR applications. Moreover, the "mo-VoiceCall" establishment cause may not indicate high throughput targets, because data packets for voice calls can be relatively small.

Overall, the "mo-Data" establishment cause, the "mo-VoiceCall" establishment cause, and other establishment cause values that can be used in existing systems may not signify, to a base station, the combination of low latency goals, high throughput goals, and/or other target goals that may be associated with XR applications as described above. Accordingly, if any such existing establishment cause values are used when a UE requests an RRC connection in association with an XR application, a base station may set up bearers and/or allocate other resources associated with the RRC connection that are insufficient to handle data associated with the XR application.

For instance, a base station may set up default bearers and/or other resources for an RRC connection, for example via an RRC connection setup message and/or a subsequent RRC reconfiguration message, in response to an RRC connection request from a UE that includes an "mo-Data" establishment cause. The UE and the base station may thus use the allocated resources to exchange data associated with an XR application. However, because of the low latency goals, high throughput goals, and/or other target goals associated with XR applications discussed above, the resources allocated based on the "mo-Data" establishment cause may be insufficient to transmit the data associated with an XR application, and/or the XR application may provide a poor user experience. In some situations, the base station may become overloaded and/or the allocated resources may fail in association with the RRC connection, and the base station may respond by tearing down allocated bearers or otherwise terminating or reconfiguring resources associated with the RRC connection.

As an example, the base station may initially set up default or non-prioritized bearers for an RRC connection in response to an RRC connection request from a UE. For instance, the base station may set up a signaling radio bearer associated with the RRC connection in response to the RRC connection request, and provide configuration information about the signaling radio bearer in an RRC connection setup message returned to the UE. The base station may also set up default data radio bearers and/or other data radio bearers for the RRC connection, and send configuration information about the data radio bearers to the UE in an RRC reconfiguration message. The UE may begin using the data radio bearers to send and receive data associated with an XR application. However, at a later point in time after setting up the data radio bearers, the base station may determine that the data radio bearers that were set up earlier have proven to be insufficient for the data being transmitted via the data radio bearers, for instance based on analysis of data packets that have been transmitted via the data radio bearers, based on Quality of Service (QOS) parameters associated with the data packets that are provided after the RRC connection request and/or after the base station has set up the default data radio bearers for the RRC connection, or based on any other information. The base station may respond by tearing down the original data radio bearers and/or setting up new prioritized data radio bearers for the RRC connection. Such a delay between the initial setup of data radio bearers for the RRC connection and later teardown and reconfiguration of data radio bearers may interrupt the XR application and negatively impact user experiences with the XR application.

The systems and methods described herein can indicate, via an XR establishment cause value within an RRC connection request, that a requested RRC connection will be associated with an XR application. A base station can thus determine up front that the requested RRC connection will be associated with an XR application. Accordingly, the base station can determine whether the base station has available resources to set up bearers and other resources for the RRC connection that are appropriate to transmit data associated with the XR application, and/or can set up or reserve such resources for the RRC connection in response to the RRC connection request. For example, the base station may respond to the RRC connection request by setting up, and/or allocating or reserving resources for, prioritized bearers, a QoS flow, or other resources that may be most likely to meet latency targets, throughput targets, and/or other target goals associated with XR applications. Accordingly, because the base station can respond to the RRC connection request by setting up, allocating, and/or reserving resources appropriate for the XR application, data for the XR application can be transmitted via the appropriate resources once the RRC connection has been set up, and the base station can avoid setting up initial resources that are insufficient to handle data for the XR application and that may have to later be torn down and/or reconfigured.

Example Environment

FIG. 1 shows an example 100 of a network environment in which a UE 102 can connect to a telecommunication network via at least one base station 104. When the UE 102 connects to the telecommunication network via the base station 104, the UE 102 can engage in communication sessions via the telecommunication network.

In particular, the UE 102 can engage in communication sessions associated with one or more types of Extended Reality (XR) applications via the telecommunication network when the UE 102 is connected to the telecommunication network. For example, an XR application server 106 remote from the UE 102 may execute one or more elements of an XR application being used by the UE 102. The UE 102 can use the XR application at least in part by exchanging one or more types of XR application data 108 with the XR application server 106 via the telecommunication network. For instance, the UE 102 may locally execute a front-end portion of the XR application to receive user data, capture sensor data, and/or input, and can send such data to the XR application server 106 as XR application data 108. The XR application server 106 can process the XR application data 108 received from the UE 102, and can return corresponding images, audio, and/or other content back to the UE 102 as XR application data 108. The UE 102 can thus present content associated with the XR application based on the XR application data 108 received from the XR application server 106.

As another example, the UE 102 may locally execute an XR application, and may exchange one or more types of XR application data 108 with one or more other UEs that are also executing instances of the XR application, directly or via the XR application server 106. For example, the UE 102 may execute an XR application that presents representations of the user and other users. Accordingly, the UE 102 can exchange one or more types of XR application data 108 with another UE associated with another user, for instance by sending XR application data 108 about a user of the UE 102 and to receive XR application data 108 about the user of another UE.

XR applications can include virtual reality (VR) applications, augmented reality (AR) applications, and/or mixed reality (MR) applications. VR applications can be configured to present visual data, audio data, and/or other data associated with a virtual environment to a user via the UE 102, for instance to immerse the user in the virtual environment by providing the user with stimuli that may mimic what the user would experience if the user was actually within the virtual environment. AR applications can be configured to present information via the UE 102 that enhance a real environment, for instance by overlaying information, rendered items, and/or other content over images of a real environment that are captured by one or more cameras of the UE 102. MR applications can overlay virtual items over a presentation of a real environment via the UE 102, such that that the virtual items may appear to a user to be part of the real environment, and may allow the user to virtually interact with the virtual items as if the virtual items were actually in the real environment.

XR applications can be associated with various use cases. For example, 3GPP TS 26.928 discusses various XR use cases such as 3D image messaging, AR sharing, immersive online gaming, real-time communications, AR guided assistance, virtual meetings, and 3D shared experiences. The UE 102 can accordingly use one or more XR applications via the telecommunication network that are associated with these or other XR use cases.

In some examples, the UE 102 may be a headset or other head-mounted display that can be worn by a user, and that have one or more screens configured to present three-dimensional and/or two-dimensional images associated with one or more types of XR applications to the user. For instance, the UE 102 may be a headset that is configured to execute VR applications that immerse a user in a virtual environment, and/or AR or MR applications that enhance a real-world environment around the user by overlaying virtual items and/or other data over images captured by one or more cameras of the UE 102.

In other examples, the UE 102 may be a smartphone, tablet computer, or other computing device that may have cameras, a screen, and/or other sensors. In these examples, the UE 102 can execute AR or MR applications that enhance a real-world environment around the UE 102 by presenting, on a screen of the UE 102, images that overlay virtual items and/or other data over images captured by one or more cameras of the UE 102.

In still other examples, the UE 102 may be a combination of multiple devices, such as an XR device that executes XR applications and an intermediate device that connects the XR device to the base station 104. The intermediate device can be a smartphone, wireless router, or other device that can wirelessly connect to the base station 104, and that can establish a wired or wireless connection to the XR device. As an example, a VR headset can have a tethered data connection to a smartphone, and the smartphone can wirelessly connect to the base station 104. As another example, a VR headset can connect to a local Wi-Fi® network provided by a wireless router in a home or other environment, and the wireless router can wirelessly connect to the base station 104. In these examples, the XR device, the intermediate device, and/or the combination of the XR and the intermediate device can be considered to be the UE 102.

The UE 102 can have one or more cameras, sensors, and/or other input elements that capture information about the environment surrounding the UE 102 and/or a user of the UE 102, information about the position and movement of the UE 102 and/or the user, user input provided by the user, and/or any other data that may be used in association with XR applications. For example, the UE 102 can have one or more accelerometers, gyroscopes, and/or other positional or movement sensors that can sense an orientation of the UE 102 and/or movement of the UE 102 over time, such that the XR applications can present images and/or audio that correspond with the orientation and/or movement of the UE 102. For instance, if the UE 102 is a VR headset worn by a user, the VR headset can track movements of the VR headset as the user moves his or her head. Accordingly, as the user moves his or her head, positional movement data captured by the VR headset can be used to present visual and/or audio data associated with a virtual environment that match the head movements of the user.

As discussed above, the UE 102 can use an XR application by sending and/or receiving XR application data 108, for instance by exchanging XR application data 108 with the XR application server 106 and/or another UE. The XR application data 108 can include sensor data 110, image data 112, audio data 114, and/or any other type of data associated with an XR application. In some examples, the XR application server 106 can be configured to remotely execute one or more portions of the XR application based on one or more types of uplink XR application data 108 sent by the UE 102 via the telecommunication network. The XR application server 106 can also send one or more types of downlink XR application data 108 to the UE 102 via the telecommunication network, such that the UE 102 can present content to a user based on the downlink XR application data 108 received from the XR application server 106.

The sensor data 110 can include data captured by one or more sensors of the UE 102, and/or other information derived from data captured by such sensors. For example, as discussed above, the UE 102 can have accelerometers, gyroscopes, and/or other positional or movement sensors that can sense an orientation of the UE 102 and/or movement of the UE 102 over time. The UE 102, or other linked devices, may have cameras or other sensors that may indicate positions and/or movements of a user and/or items held by the user, information about the environment surrounding the user and/or the UE 102, and/or other information. The UE 102 and/or other linked devices may include handheld controllers or other user input devices, which the user may use to provide input while using XR applications. The sensor data 110 that the UE 102 sends, for instance to the XR application server 106, can include any of these or other types of information, such as positional data, movement data, user input data, and/or other types of data.

In some examples, the sensor data 110 can include three degrees of freedom (3DoF) movement data, including rotational and/or other movement data around X, Y, and Z axes, such as pitch, yaw, and roll data, relative to a point on the UE 102. In other examples, the sensor data 110 can include 3DoF+ movement data that includes 3DoF data along with additional translational movement data, such as movements of the overall UE 102 within a surrounding environment in X, Y, and Z axes. 3DoF+ movement data may, for instance, be used when the UE 102 is a head-mounted display and the user is seated in a chair, to capture movements of the user's head up and down, forwards and backwards, and from side to side, in addition to yaw, pitch, and roll of the head-mounted display itself. In still other examples, the sensor data 110 can include six degrees of freedom (6DoF) movement data that includes 3DoF movement data of the UE 102, as well as data that captures movements of a user within a constrained or unconstrained environment. 6DoF movement data may, for instance, be used when the UE 102 is a head-mounted display and the user is free to move around a room, to capture movements of the user as the user crouches, stands, walks around, and/or otherwise moves, in addition to yaw, pitch, and roll of the head-mounted display itself.

Uplink XR application data 108 sent by the UE 102, for instance to the XR application server 106 and/or to other UEs, can include sensor data 110, image data 112, and/or and audio data 114 captured by the UE 102. For instance, in some examples, the UE 102 can send images captured by one or more cameras of the UE 102, and/or audio captured by one or more microphones of the UE 102, to the XR application server 106 and/or other UEs.

The XR application server 106 and/or other UEs can also return downlink XR application data 108 to the UE 102 that includes image data 112 and/or audio data 114. For example, based on sensor data 110 and/or other XR application data 108 provided by the UE 102 that indicates movements of the UE 102, the XR application server 106 can return image data 112 and/or audio data 114 that corresponds to the movements of the UE 102, such as rendered three-dimensional images of a virtual environment, three-dimensional audio, rendered digital items or other content to overlay over images captured by the UE 102, and/or other content that the UE 102 can present to a user. In some examples, the downlink XR application data 108 sent by the XR application server 106 may also include sensor data 110 or information associated with sensor data 110, such as instructions on which types of sensor data 110 the UE 102 should collect, sampling rates for one or more types of sensor data 110 to be collected by the UE 102, and/or any other information. Other UEs may also send sensor data 110 indicating user inputs, motion data, and/or other information captured by the other UEs.

As an example, the XR application server 106 may be a cloud gaming server for a VR game that receives sensor data 110, including movement data, user input, and/or other types of information, in uplink XR application data 108 sent by the UE 102. The cloud gaming server can retrieve, generate, and/or render image data 112 and/or audio data 114 that corresponds to the received uplink XR application data 108, such as rendered three dimensional images of a virtual environment that are presented from an angle that matches an orientation of the UE 102 indicated by the sensor data 110 provided by the UE 102. The cloud gaming server can send downlink XR application data 108, including image data 112 and/or audio data 114 determined by the cloud gaming server, to the UE 102 so that the UE 102 can present corresponding content to a user. Accordingly, the UE 102 can engage in a VR game that responds to sensor data 110 captured by the UE 102, but presents corresponding images that are rendered remotely by the cloud gaming server instead of locally by the UE 102.

As discussed above, the UE 102 can wirelessly connect to at least one base station 104 of the telecommunication network, such that the UE 102 can engage in an XR application by exchanging one or more types of XR application data 108 with the XR application server 106 and/or other UEs. The base station 104 can be part of an access network of the telecommunication network, such as a radio access network (RAN). The telecommunication network can also have a core network 116 linked to the access network. The UE 102 can wirelessly connect to a base station 104 of the access network, and in turn be connected to the core network 116 via the base station 104. The core network 116 can also link the UE 102 to an Internet Protocol (IP) Multimedia Subsystem (IMS), the Internet, and/or other networks, which may include or connect to the XR application server 106. The UE 102 can accordingly communicate with the XR application server 106 via a connection that extends through the base station 104 and/or other elements of the access network, and through the core network 116. The UE 102 may also communicate with other UEs in association with an XR application directly through the access network, core network 116, the XR application server 106, and/or other networks or elements.

The UE 102 and elements of the telecommunication network, such as the base station 104, other elements of the access network, and/or the core network 116, can be compatible with one or more radio access technologies, wireless access technologies, protocols, and/or standards. For example, the UE 102, the base station 104, and/or the core network 116 can support 5G NR technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, Wi-Fi® technology, and/or any other previous or future generation of radio access technology.

As an example, the base station 104 can be a gNB of a 5G access network. As another example, the access network can be an LTE access network, known as an Evolved UMTS Terrestrial Radio Access Network (E-UTRAN), and the base station 104 can be an evolved Node B (eNB) of the LTE access network. The core network 116 can also be based on LTE or 5G. For instance, the core network 116 can be a 5G core network or an LTE packet core network known as an Evolved Packet Core (EPC). The base station 104 and the core network 116 may be based on the same radio access technology, or different radio access technologies. For instance, in some examples the base station 104 can be a 5G gNB that is linked to an LTE core network and/or a 5G core network.

The UE 102 can transmit data to, and/or receive data from, the base station 104. For example, the UE 102 can receive downlink transmissions from the base station 104, and/or send uplink transmissions to the base station 104. A Radio Resource Control (RRC) connection can be set up between the UE 102 and the base station 104, such that the UE 102 and the base station 104 can use the RRC connection for downlink and/or uplink transmissions. For example, as discussed further below, when the UE 102 initiates an XR application that sends and/or receives XR application data 108, the UE 102 can request that the base station 104 establish an RRC connection that can be used by the UE 102 to send and receive the XR application data 108 associated with the XR application.

The UE 102 can be configured to transition between different RRC states. For example, RRC states can include an RRC_Idle state (RRC_IDLE) in which the UE 102 does not have an RRC connection with a base station, and an RRC Connected state (RRC_CONNECTED) in which the UE 102 does have an active RRC connection with a base station. The UE 102 can be in the RRC_Idle state when no RRC connection is established between the UE 102 and a base station. For example, the UE 102 can be in the RRC Idle state when the UE 102 initially powers on and has not yet established an RRC connection with a base station. As another example, when an established RRC connection between the UE 102 and a base station is released, the UE 102 can move from the RRC Connected state to the RRC Idle state. When an RRC connection is established between the UE 102 and a base station, the UE 102 can enter the RRC Connected state.

To establish a new RRC connection with the base station 104, the UE 102 can send an RRC connection request 118 to the base station 104. In response to the RRC connection request 118, the base station 104 can set up and/or configure a corresponding RRC connection between the base station 104 and the UE 102. For example, the base station 104 can set up radio bearers, such as default bearers and/or dedicated bearers. Bearers associated with the RRC connection can include one or more signaling radio bearers (SRBs) used to transmit RRC messages and/or other signaling messages, and/or one or more data radio bearers (DRBs) used to transmit data such as the XR application data 108. The base station 104 can also send one or more RRC connection setup responses 120 to the UE 102 in response to the RRC connection request 118. The RRC connection setup responses 120, such as an RRC connection setup message and/or an RRC reconfiguration message, can indicate information about one or more bearers that the base station 104 has set up for the RRC connection, and/or other configuration information associated with the RRC connection.

As an example, in response to the RRC connection request 118, the base station 104 can set up an SRB to be used to transmit signaling messages associated with the RRC connection. The base station 104 may also determine Physical Uplink Shared Channel (PUSCH) information, Physical Uplink Control Channel (PUCCH), Physical Downlink Shared Channel (PDSCH), scheduling information, and/or other configuration information associated with the RRC connection. The base station 104 can also return an RRC connection setup message to the UE 102, in response to the RRC connection request 118, that includes information about the SRB and/or other configuration information associated with the RRC connection. The UE 102 can enter the RRC Connected state based on the RRC connection setup message. The base station 104 can also set up one or more data radio bearers associated with the RRC connection, and send information about the data radio bearers to the UE 102 in an RRC reconfiguration message. Accordingly, the RRC connection setup message and the RRC reconfiguration message can be RRC connection setup responses 120 that indicate information about the RRC connection that has been set up by the base station 104, such as information about default and/or dedicated bearers associated with the RRC connection, configuration information, and/or any other information. The UE 102 can thus send and/or receive data, including XR application data 108, via one or more DRBs associated with the RRC connection with the base station 104.

As shown in FIG. 1, the RRC connection request 118 sent by the UE 102 to the base station 104 can identify an XR establishment cause 122. RRC connection requests can include an "establishmentCause" field that can hold one of a set of possible values indicating reasons why UEs are requesting RRC connections. The XR establishment cause 122 can be a particular value of the "establishmentCause" field of the RRC connection request 118 that signifies, to the base station 104, that the UE 102 is requesting an RRC connection in association with an XR application and/or that the RRC connection will be used to transmit one or more types of XR application data 108. For example, the XR establishment cause 122 may be a value such as "xr-Data," "mo-XRData," "mt-XRData," or other value of the "establishmentCause" field of the RRC connection request 118 that corresponds with XR applications and/or XR application data 108.

The presence of the XR establishment cause 122 in the RRC connection request 118 can signify, to the base station 104, that the UE 102 is requesting an RRC connection that will be used to send and receive XR application data 108 associated with an XR application. Accordingly, the base station 104 may respond to the RRC connection request 118 based on how the base station 104 is configured to handle or prioritize XR application data 108, and/or based on resources available to the base station 104. The base station 104 may, for instance, determine whether the base station 104 has sufficient resources to handle XR application data 108, and if so may allocate and/or reserve such resources for the RRC connection based on the presence of the XR establishment cause 122 in the RRC connection request 118.

For example, XR applications and corresponding user experiences may be sensitive to latency, throughput, and/or other metrics associated with uplink and/or downlink transmissions of XR application data 108 via the base station 104. For instance, if image data 112 associated with an immersive VR application is presented via the UE 102 at low framerates, at low resolutions, and/or a relatively long time after corresponding sensor data 110 was captured, a user may have a poor experience and/or be more likely to experience motion sickness and other negative impacts. However, if such image data 112 associated with an immersive VR application is presented via the UE 102 at higher framerates, at higher resolutions, and/or relatively quickly after corresponding sensor data 110 and/or user input was captured, a user may have a good experience and/or be less likely to experience motion sickness and other negative impacts.

Accordingly, as a non-limiting example, target parameters for image data 112 provided by the XR application server 106 to the UE 102 via the telecommunication network may include high frame rates of 60 frames per second or more, image resolutions of 4K or more, average data rates of 30 Mbit/s or higher, and/or latencies associated with packet delay budgets of 10 ms or less. Similarly, as a non-limiting example, target parameters for sensor data 110 provided by the UE 102 to the XR application server 106 via the telecommunication network may include a sampling rate for the sensor data 110 of 60 hertz or higher, and/or latencies associated with packet delay budgets of 10 ms or less. In other examples, target values for latencies, throughput, and/or other parameters can be higher or lower than the examples values discussed above.

In some examples, the base station 104 may be configured to prioritize traffic associated with XR applications over other types of traffic. Accordingly, if the base station 104 receives the RRC connection request 118 and determines that the RRC connection request 118 includes the XR establishment cause 122, the base station 104 may establish an RRC connection for the UE 102 that is associated with one or more prioritized bearers, is associated with reserved and/or prioritized resources of the base station 104, is associated with a prioritized QoS flow, and/or is otherwise configured to prioritize transmission of XR application data 108 to increase likelihoods of meeting latency goals, throughput goals, and/or other target goals associated with XR applications. For instance, the base station 104 may respond to the RRC connection request 118 that includes the XR establishment cause 122 by setting up an SRB for the RRC connection and returning a corresponding RRC connection setup message, and also by allocating and/or reserving resources that can be used to set up a prioritized DRB for the XR application data 108. Once the prioritized DRB has been set up, the base station 104 can send a corresponding RRC reconfiguration request to the UE 102. The base station 104 may also, in some examples, instruct the UE 102 to use frequency bands, carriers, and/or other resources that may increase likelihoods of meeting latency goals, throughput goals, and/or other target goals associated with XR applications.

In other examples, the base station 104 may be configured to prioritize one or more other types of traffic, such as traffic for voice calls, over traffic for XR applications. Accordingly, the base station 104 may respond to the RRC connection request 118 that includes the XR establishment cause 122 by setting up an RRC connection with bearers, a QoS flow, and/or other resources that may be used to transmit XR application data 108, but that may be less prioritized than resources associated with other connections for voice call traffic and/or other traffic associated with types of higher-priority services.

In still other examples, the base station 104 may respond to the RRC connection request 118 that includes the XR establishment cause 122 by determining whether the base station 104 has available resources that could be dedicated to handle XR application data 108. The base station 104 can, for example, have access control elements that can determine whether the base station 104 can accept the RRC connection request 118 and set up a corresponding RRC connection, or whether the base station 104 should instead reject the RRC connection request 118.

For instance, if the RRC connection request 118 including the XR establishment cause 122 is received by the base station 104 at a time when the base station 104 is already connected to numerous other UEs and does not have resources available that could be allocated to an RRC connection that is intended to be used to transfer XR application data 108, the base station 104 may reject the RRC connection request 118. Similarly, the base station 104 may determine based on signal-to-noise levels and/or other metrics, for instance if the UE 102 is at a cell edge position relatively far away from the base station 104, that the base station 104 would be unlikely to meet latency goals, throughput goals, and/or other target goals associated with XR applications. Accordingly, in these situations, the base station 104 may determine not to set up an RRC connection in response to the RRC connection request 118 that includes the XR establishment cause 122, and an RRC connection setup response 120 returned by the base station 104 may be a rejection message instead of an RRC connection setup message and/or an RRC reconfiguration message. The rejection message from the base station 104 may cause the UE 102 to try connecting to a different base station, or the UE 102 can be configured to retry sending the RRC connection request 118 to the same or a different base station at a later point in time after receiving the rejection message.

Accordingly, overall, the presence of the XR establishment cause 122 in the RRC connection request 118 can signify to the base station 104 that the UE 102 will be using the requested RRC connection to send and receive XR application data 108. The base station 104 can accordingly respond by determining whether the base station 104 has resources available that could be reserved and/or allocated to such an RRC connection associated with XR application data 108 that may be associated with low latencies, high throughput, and/or other metrics associated with XR applications. If the base station 104 does have such resources available, the base station 104 can set up an RRC connection configured to handle XR application data 108, for instance by setting up dedicated and/or prioritized bearers, a QoS flow, and/or allocating other resources, that may be most likely to meet latency goals, throughput goals, and/or other target goals associated with XR applications. By initially setting up the RRC connection at least in part by reserving and/or allocating resources that may be most likely to meet target goals associated with XR applications, the chances of the RRC connection later being tom down and/or reconfigured because such target goals are not being met can be lowered.

The example 100 shown in FIG. 1 can be used when the UE 102 is a mobile originating (MO) device that itself initiates an XR application and requests an RRC connection so that the UE 102 can communicate with the XR application server 106 and/or other UEs. However, in other examples the UE 102 can be a mobile terminating (MT) device.

Figure 2:
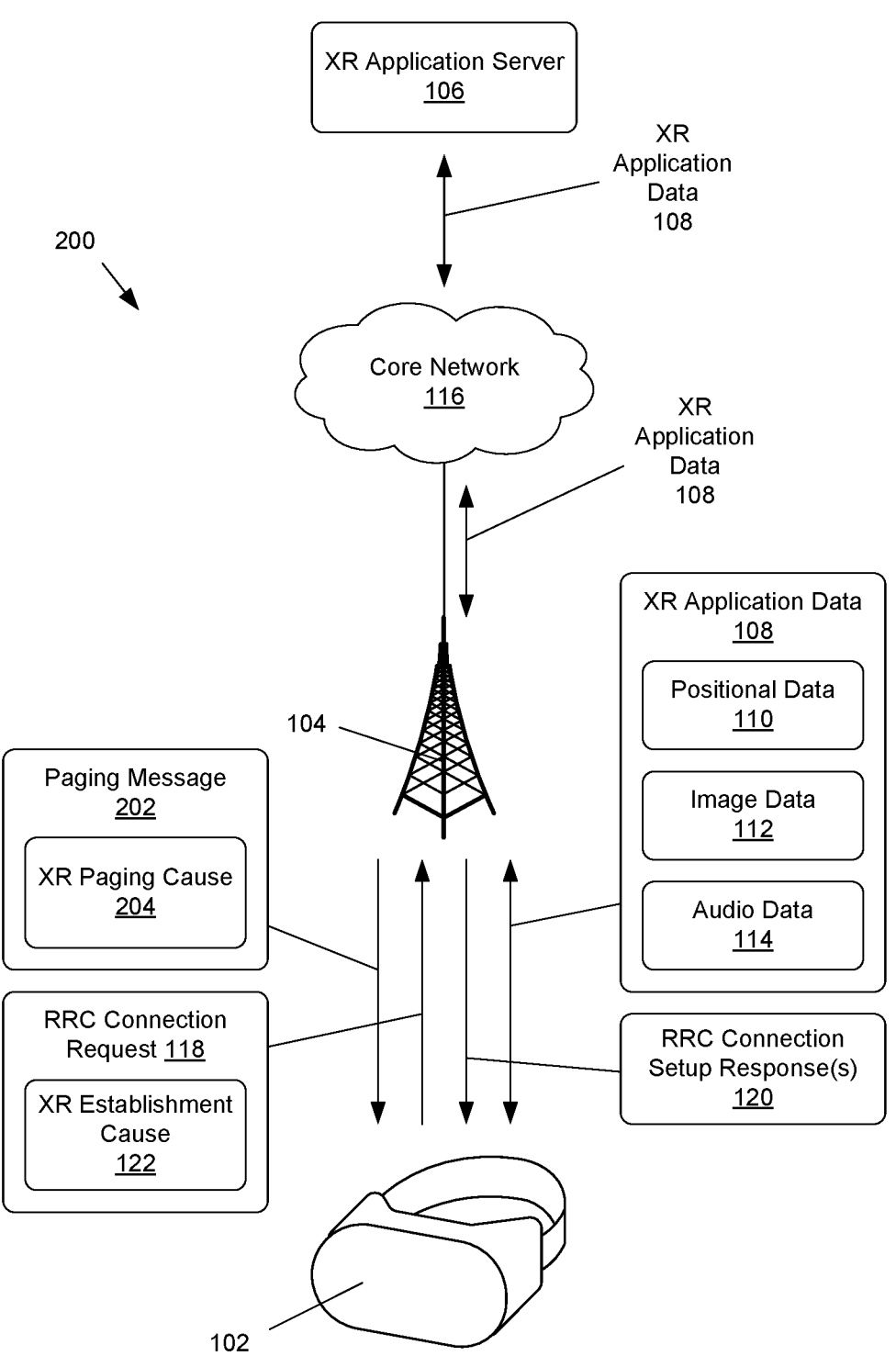
FIG. 2 shows an example in which the UE is a mobile terminating (MT) device, that may initiate a communication session associated with an XR application in response to a paging message sent by a base station.

For instance, FIG. 2 shows an example 200 in which the UE 102 is an MT device, that may initiate an XR application and communicate with the XR application server 106 and/or other UEs in response to a paging message 202 sent by the base station 104. The paging message 202 can be an indication that the XR application server 106, another UE, or any other element is attempting to set up a communication session with the UE 102 that is associated with an XR application. For instance, an XR application executed via the XR application server 106 can be associated with a virtual meeting room that multiple users of multiple UEs can join, and another UE may be attempting to invite a user of the UE 102 to the virtual meeting room. Accordingly, the XR application server 106 may provide data to the telecommunication network that prompts the base station 104 to send the paging message 202 to the UE 102, such that the UE 102 can respond to the paging message 202 and join the virtual meeting room.

When the XR application server 106, another UE, or any other network element attempts to set up a communication session with the UE 102 via the telecommunication network, one or more elements of the core network 116, such as a User Plane Function (UPF) and/or an Access and Mobility Management Function (AMF), can notify the base station 104. The base station 104 can send the paging message 202 to the UE 102. For example, the base station 104 can broadcast the paging message 202, but include an identifier of the UE 102 within the paging message 202 to indicate that at least a portion of the paging message 202 is associated with the UE 102. For example, the identifier of the UE 102 in the paging message 202 may be a Paging Radio Network Temporary Identifier (P-RNTI) associated with the UE 102. Although the UE 102 can be in the RRC Idle mode, the UE 102 can periodically determine if any paging messages have been received that include the identifier of the UE 102.

As shown in FIG. 2, the base station 104 can include an indication of an XR paging cause 204 in the paging message 202. A paging message sent by a base station can include a "PagingCause" field that can hold one of a set of possible values indicating why the UE 102 is being paged by the base station. For instance, if a base station is paging the UE 102 due to an incoming voice call addressed to the UE 102, the "PagingCause" field of a paging message may have a "voice" value that prompts the UE 102 to request an RRC connection to answer the incoming voice call. Here however, the paging message 202 can include the XR paging cause 204, such a particular value for the "PagingCause" field, that signifies to the UE 102 that the UE 102 is being paged to join a communication session associated with an XR application. For example, the XR paging cause 204 can be a value such as "mt-XR" or any other value of the "PagingCause" field that is associated with XR applications.

The XR paging cause 204 can be included in a portion of the paging message 202 that is addressed to the UE 102. In some examples, different portions of the paging message can be associated with identifiers of different UEs. Accordingly, the XR paging cause 204 can be included in a portion of the paging message 202 that is associated with a P-RNTI or other identifier of the UE 102, when the UE 102 is being paged for a communication session associated with an XR application.

Accordingly, based on the XR paging cause 204 in the paging message 202, the UE 102 can determine to respond to the paging message 202 by sending the RRC connection request 118 that includes the XR establishment cause 122 discussed above with respect to FIG. 1. The base station 104 can respond to the RRC connection request 118 that includes the XR establishment cause 122 by determining whether the base station 104 can reserve and/or allocate resources for an RRC connection intended for XR application data 108, and/or by reserving and/or allocating such resources and by setting up the RRC connection, as discussed above with respect to FIG. 1. If the base station 104 sets up the RRC connection, the UE 102 can use the RRC connection to join the communication session associated with an XR application that the UE 102 was being paged to join.

In some examples, different base stations, such as a group of base stations in a tracking area where the UE 102 last connected to a base station, may be instructed by the core network 116 or other elements to page the UE 102. Accordingly, in these examples, different base stations can attempt to send the paging message 202 that includes the XR paging cause 204 to the UE 102. The UE 102 may receive the paging message 202 from one or more of these base stations, and send the RRC connection request 118 to one of the base stations in response.

As discussed above, the XR establishment cause 122 may be a value such as "xr-Data," "mo-XRData," "mt-XRData," or other value of the "establishmentCause" field of the RRC connection request 118. In some examples, the same value, such as "xr-Data" can be used when the UE 102 is an MO device as shown in FIG. 1, and when the UE 102 is an MT device as shown in FIG. 2. For instance, when the UE 102 receives the paging message 202 with the XR paging cause 204, the UE 102 can respond by sending the RRC connection request 118 with "xr-Data" as the XR establishment cause 122.

However, in other examples, the UE 102 may be configured to use different values of the XR establishment cause 122 depending on whether the UE 102 is an MO device or an MT device that is responding to a paging message. For instance, if the UE 102 is an MO device that is initiating a communication session associated with an XR application, the UE 102 may send the RRC connection request 118 with "mo-XRData" as the XR establishment cause 122 to signify to the base station 104 that the UE 102 is an MO device. If the UE 102 is instead an MT device that is responding to the paging message 202 that includes the XR paging cause 204, the UE 102 may send the RRC connection request 118 with "mt-XRData" as the XR establishment cause 122 to signify to the base station 104 that the UE 102 is an MT device.

In some examples, the base station 104 may be configured to respond differently to different values of the XR establishment cause 122. For example, the base station 104 may be configured to prioritize setting up an RRC connection for a UE when the UE is responding to a paging message and includes "mt-XRData" as the XR establishment cause 122, over setting up a similar RRC connection for another UE that is an MO device and includes "mo-XRData" as the XR establishment cause 122. However, in other examples the base station 104 may be configured to respond in the same way to different values of the XR establishment cause 122.

Example Architecture

Figure 3:
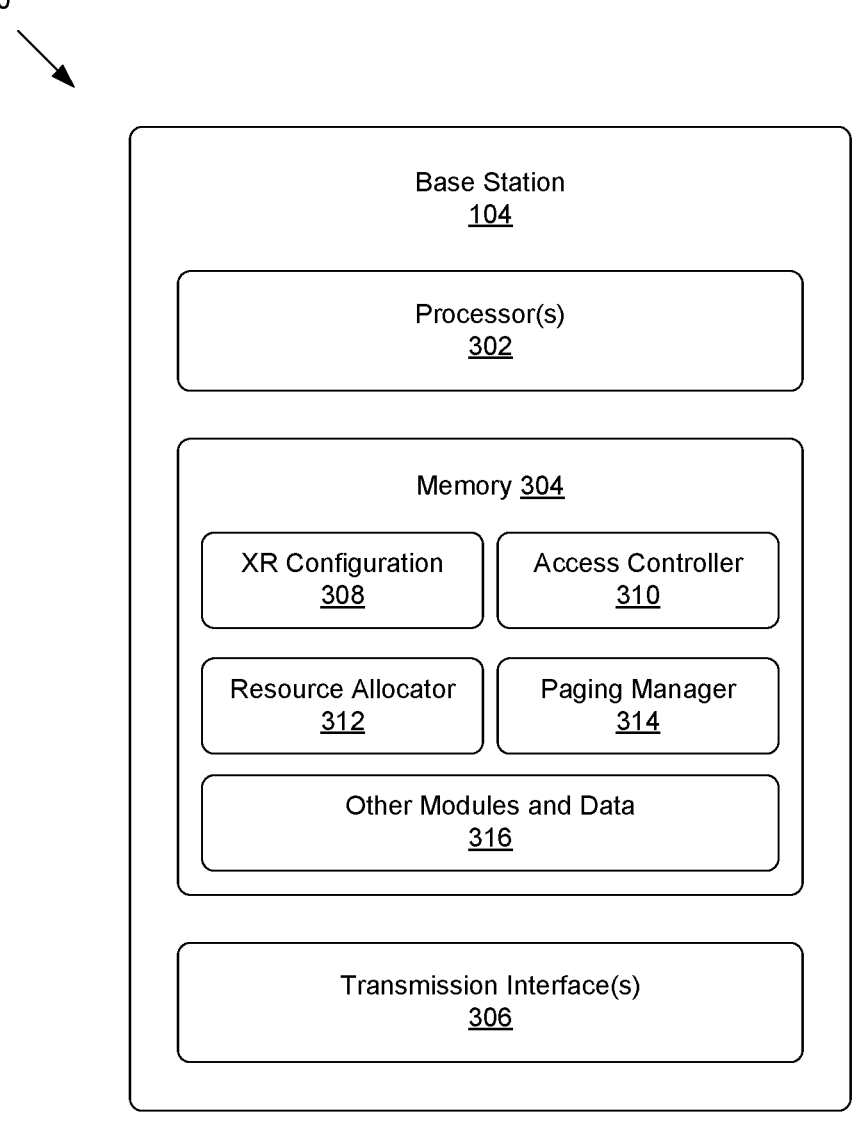
FIG. 3 shows an example of a system architecture for a base station.

FIG. 3 shows an example 300 of a system architecture for the base station 104, in accordance with various examples. The base station 104 can be a 5G gNB, an LTE eNB, or other type of base station as described above. As shown, the base station 104 can include processor(s) 302, memory 304, and transmission interfaces 306.

The processor(s) 302 may be a central processing unit (CPU) or any other type of processing unit. Each of the one or more processor(s) 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing all computer-executable instructions and/or computer applications stored in the memory 304.

In various examples, the memory 304 can include system memory, which may be volatile (such as RAM), non-volatile (such as ROM, flash memory, etc.) or some combination of the two. The memory 304 can also include additional data storage devices (removable and/or non-removable) such as, for example, magnetic disks, optical disks, or tape. Memory 304 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The memory 304 can store computer-readable instructions and/or other data associated with operations of the base station 104. For example, the memory 304 can store computer-readable instructions and/or other data associated with an XR configuration 308, an access controller 310, a resource allocator 312, a paging manager 314, and/or other modules and data 316.

The XR configuration 308 can indicate how the base station 104 is configured to set up and/or prioritize RRC connections associated with XR applications. For example, the XR configuration 308 may indicate latency goals, throughput goals, and/or other target goals associated with XR applications. The XR configuration 308 may also, or alternately, indicate types of bearers to set up for XR applications that may be most likely to meet such target goals for XR applications, frequency bands and/or carrier configurations that may be most likely to meet such target goals for XR applications, and/or other types of resources that the base station 104 is configured to allocate to increase the likelihood of meeting such target goals for XR applications. In some examples, the XR configuration 308 may also indicate whether the base station 104 is configured to prioritize traffic for XR applications over one or more other types of traffic.

The access controller 310 can be configured to determine whether the base station 104 should accept or reject an RRC connection request that includes the XR establishment cause 122. For example, when the base station 104 receives the RRC connection request 118 with the XR establishment cause 122 from the UE 102, the base station 104 can review resources currently allocated to other RRC connections, and can determine whether remaining available resources could be allocated, based on the XR configuration 308, to a new RRC connection for XR application data 108. If the access controller 310 determines that the base station 104 does not have sufficient available resources to set up a new RRC connection for XR application data 108, the access controller 310 can cause the base station 104 to reject the RRC connection request. However, if the access controller 310 determines that the base station 104 does have sufficient available resources to set up a new RRC connection for XR application data 108, the access controller 310 can instruct the resource allocator 312 and/or other elements of the base station 104 to allocate and/or reserve such resources and to set up the RRC connection.

The resource allocator 312 can set up an RRC connection for XR application data 108 by setting up one or more bearers, associating a QoS flow with the bearers or the RRC connection, and/or reserving or allocating other resources available to the base station, in association with the RRC connection. The resource allocator 312 can, for example, set up and/or reconfigure the RRC connection by setting up bearers and/or allocating other resources based on the XR configuration 308.

The paging manager 314 can be configured to send the paging message 202 to the UE 102. For example, based on instructions from the core network 116 or another element indicating that the XR application server 106 or another element is attempting to set up a communication session with the UE 102 that is associated with an XR application, the paging manager 314 can cause the base station 104 to broadcast the paging message 202 that includes the XR paging cause 204 in a portion of the paging message 202 addressed to the UE 102.

The other modules and data 316 can be utilized by the base station 104 to perform or enable performing any action taken by the base station 104. The other modules and data 316 can include a platform, operating system, firmware, and/or applications, and data utilized by the platform, operating system, firmware, and/or applications.

The transmission interfaces 306 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with the UE 102, other base stations or RAN elements, elements of the core network 116, and/or other network elements, and can transmit data over such connections. For example, the transmission interfaces 306 can establish a connection with the UE 102 over an air interface. The transmission interfaces 306 can also support transmissions using one or more radio access technologies, such as 5G NR. The transmission interfaces 306 can also be used by the base station 104 to establish an RRC connection with the UE 102 in response to the RRC connection request 118 that includes the XR establishment cause 122, send the paging message 202 that includes the XR paging cause 204, and/or to send or receive any other data.

Figure 4:
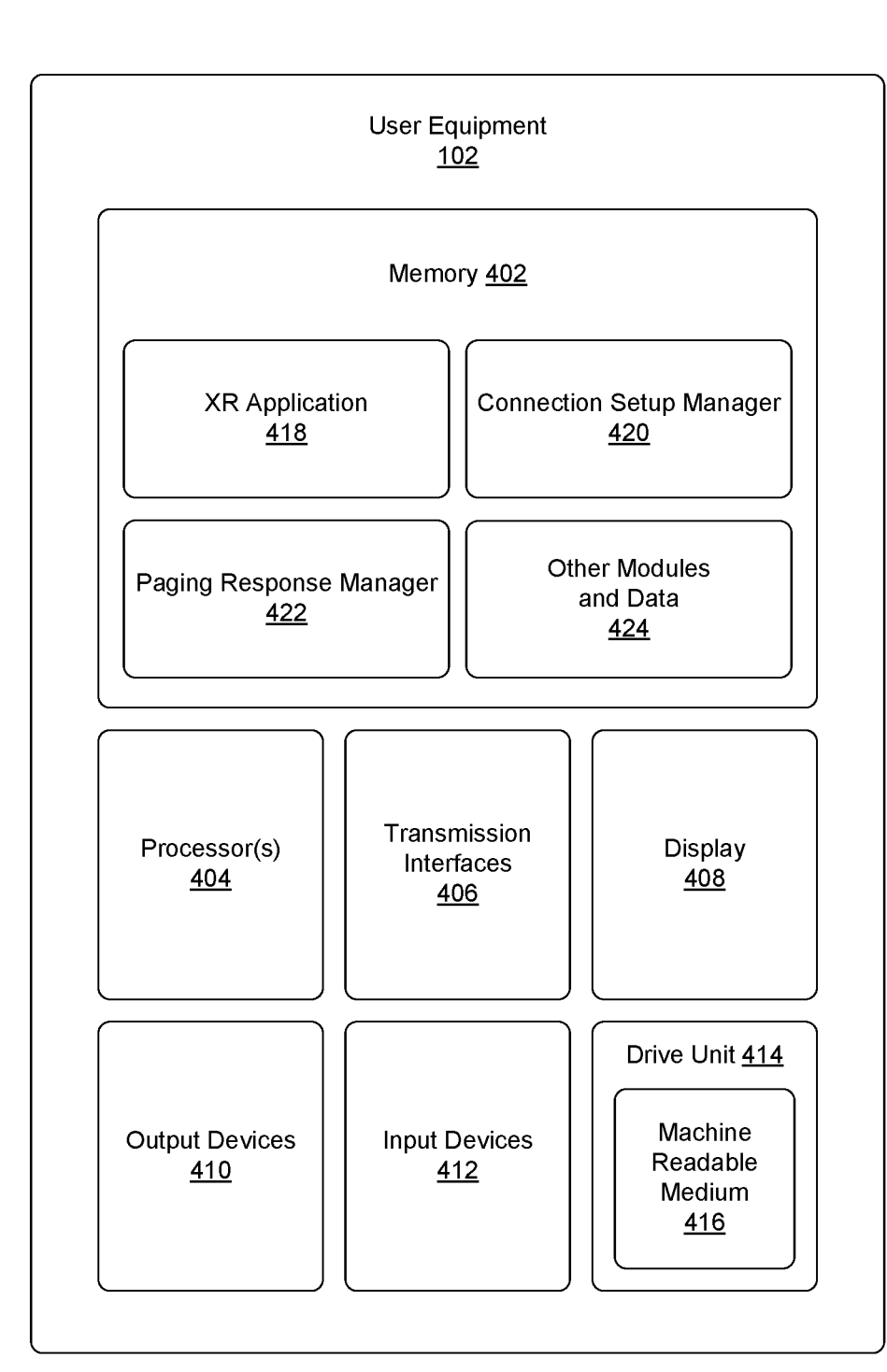
FIG. 4 shows an example of system architecture for a UE.

FIG. 4 shows an example 400 of system architecture for the UE 102, in accordance with various examples. The UE 102 can have at least one memory 402, processor(s) 404, transmission interfaces 406, a display 408, output devices 410, input devices 412, and/or a drive unit 414 including a machine readable medium 416.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 402 can include one or more software or firmware elements, such as data and/or computer-readable instructions that are executable by the one or more processors 404. For example, the memory 402 can store computer-executable instructions and data associated with an XR application 418, a connection setup manager 420, a paging response manager 422, and/or other modules and data 424.

The XR application 418 can be a VR application, AR application, MR application, or other type of XR application. In some examples, the XR application 418 can have a front-end or other elements that are locally executed by the UE 102, and may have other elements that are executed remotely by the XR application server 106. For example, local portions of the XR application 418 can be executed by the UE 102 to capture sensor data 110, such as movement data, user input, and/or other data, capture image data 112, capture audio data 114, and/or other types of data. The local portions of the XR application 418 can also be executed by the UE 102 to send one or more types of sensor data 110, image data 112, audio data 114, and/or other data to the XR application server 106 as uplink XR application data 108, and to present content to a user locally based on corresponding downlink XR application data 108 returned by the XR application server 106. In other examples, the XR application 418 may be executed locally, but can send uplink XR application data 108 to the XR application server 106 and/or one or more other UEs, and can present content based at least in part on downlink XR application data 108 received from the XR application server 106 and/or one or more other UEs.

The connection setup manager 420 can be configured to send the RRC connection request 118, including the XR establishment cause 122, to the base station 104. For example, the connection setup manager 420 can be configured to monitor events that occur on the UE 102, to determine when the UE 102 initiates the XR application 418 and/or has XR application data 108 to send to the XR application server 106 or one or more other UEs. Accordingly, when the connection setup manager 420 determines that the UE 102 has initiated the XR application 418 and/or has XR application data 108 to send, the connection setup manager 420 can generate and send the RRC connection request 118, including the XR establishment cause 122, to the base station 104. Similarly, the connection setup manager 420 can generate and send the RRC connection request 118, including the XR establishment cause 122, to the base station 104 when the paging response manager 422 indicates that a paging message has been received that includes the XR paging cause 204.

The paging response manager 422 can be configured to listen for paging messages that include an identifier of the UE 102, and to determine how the UE 102 is to respond to such paging messages. For example, if a paging message includes a portion with the identifier of the UE 102 and the XR paging cause 204, the paging response manager 422 can instruct the connection setup manager 420 can generate and send the RRC connection request 118, including the XR establishment cause 122, to the base station 104 as described above.

The other modules and data 424 can be utilized by the UE 102 to perform or enable performing any action taken by the UE 102. The other modules and data 424 can include a platform, operating system, firmware, and/or applications, and data utilized by the platform, operating system, firmware, and/or applications.

In various examples, the processor(s) 404 can be a CPU, a graphics processing unit (GPU), or both CPU and GPU, or any other type of processing unit. Each of the one or more processor(s) 404 may have numerous ALUs that perform arithmetic and logical operations, as well as one or more CUs that extract instructions and stored content from processor cache memory, and then executes these instructions by calling on the ALUs, as necessary, during program execution. The processor(s) 404 may also be responsible for executing all computer applications stored in the memory 402, which can be associated with types of volatile (RAM) and/or nonvolatile (ROM) memory.

The transmission interfaces 406 can include transceivers, modems, interfaces, antennas, and/or other components that perform or assist in exchanging radio frequency (RF) communications with base stations of the access network, a Wi-Fi access point, or otherwise implement connections with one or more networks. The transmission interfaces 406 can be compatible with one or more radio access technologies, such as 5G NR radio access technologies and/or LTE radio access technologies. The transmission interfaces 406 can be used by the UE 102 to send the RRC connection request 118 that includes the XR establishment cause 122, receive the paging message 202 that includes the XR paging cause 204, send uplink XR application data 108 via the base station 104, receive downlink XR application data 108 via the base station 104, and/or to send or receive any other data.

The display 408 can be a liquid crystal display or any other type of display used in UEs. As an example, the display 408 may be a touch-sensitive display screen, and can thus also act as an input device or keypad, such as for providing a soft-key keyboard, navigation buttons, or any other type of input. As another example, the display 408 may include one or more screens that can display images to a user, for instance based on image data 112 received from the XR application server 106. For instance, if the UE 102 is a VR and/or AR headset, the display 408 can include one or more screens configured to display image data 112 for both of a user's eyes.

The output devices 410 can include any sort of output devices known in the art, such as the display 408, speakers, a vibrating mechanism, and/or a tactile feedback mechanism. Output devices 410 can also include ports for one or more peripheral devices, such as headphones, peripheral speakers, and/or a peripheral display.

The input devices 412 can include a microphone, a keyboard/keypad, a touch-sensitive display, such as the touch-sensitive display screen described above, one or more sensors, such as accelerometers, gyroscopes, and/or other positioning or movement sensor configured to capture sensor data 110, and/or other input devices. A keyboard/keypad can be a push button numeric dialing pad, a multi-key keyboard, or one or more other types of keys or buttons. The input devices 412 can also include a joystick-like controller, designated navigation buttons, or any other type of input mechanism, or links to external controllers, cameras, sensors, or other elements that can provide sensor data 110, user input data, and/or any other type of input data to the UE 102.

The machine readable medium 416 can store one or more sets of instructions, such as software or firmware, that embodies any one or more of the methodologies or functions described herein. The instructions can also reside, completely or at least partially, within the memory 402, processor(s) 404, and/or transmission interface(s) 406 during execution thereof by the UE 102. The memory 402 and the processor(s) 404 also can constitute machine readable media 416.

Example Operations

Figure 5:
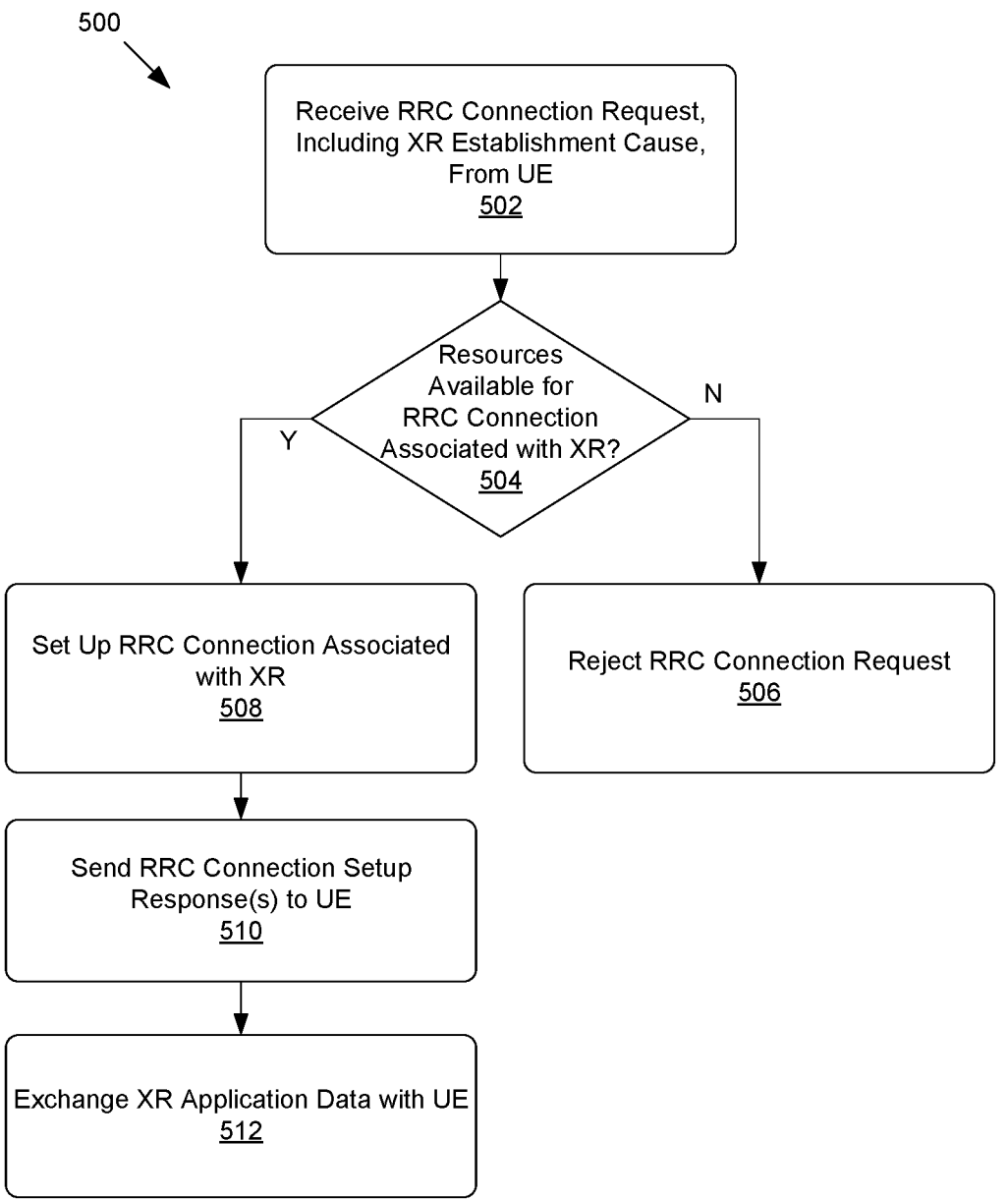
FIG. 5 shows a flowchart of an example method in which a base station can respond to a Radio Resource Control (RRC) connection request that includes an XR establishment cause.

FIG. 5 shows a flowchart of an example method 500 in which the base station 104 can respond to the RRC connection request 118 that includes the XR establishment cause 122. At block 502, the base station 104 can receive the RRC connection request 118, including the XR establishment cause 122, from the UE 102. In some examples, the UE 102 can be an MO device that is attempting to initiate a communication session associated with an XR application that involves the exchange of XR application data 108 with the XR application server 106 and/or other UEs, and can have sent the RRC connection request 118, including the XR establishment cause 122, to request that the base station 104 set up an RRC connection that can be used to send and receive the XR application data 108.

At block 504, the base station 104 can determine whether the base station 104 has resources available that could be allocated for an RRC connection associated with an XR application. For example, the XR configuration 308 of the base station 104 may indicate types of bearers to set up for XR applications that may be most likely to meet target goals for XR applications, frequency bands and/or carrier configurations that may be most likely to meet target goals for XR applications, a QoS flow identifier associated with XR applications, and/or other types of resources that the base station 104 is configured to allocate to increase the likelihood of meeting target goals for XR applications. At block 504, the base station 104 can determine whether or not such resources are currently available that could be allocated to the requested RRC connection.

If the base station 104 determines that insufficient resources are available for an RRC connection associated with an XR application (Block 504—No), for instance if the base station 104 is under a relatively heavy load and remaining available resources are unlikely to meet target goals for XR applications or if signal-to-noise and/or other metrics indicate that the base station 104 would be unable to exchange data with the UE 102 in compliance with target goals for XR applications, the base station 104 may reject the RRC connection request 118 at block 506. For example, the base station 104 may send an RRC connection setup response 120 to the UE 102 that rejects the RRC connection request 118, and/or that instructs the UE 102 to retry the RRC connection request 118 with a different base station or with the base station 104 at a later point in time when the base station 104 may have more resources available.

However, if the base station 104 determines that sufficient resources are available for an RRC connection associated with an XR application (Block 504—Yes), the base station 104 can reserve those resources and/or use the resources to set up the requested RRC connection for the UE 102 at block 508. For example, the base station 104 can use the XR configuration 308 to set up types of bearers that may be most likely to meet target goals for XR applications, allocate resources of frequency bands and/or carrier configurations that may be most likely to meet target goals for XR applications, set up a QoS flow associated with XR applications, and/or allocate other types of resources that may increase the likelihood of meeting target goals for XR applications.

At block 510, the base station 104 can send one or more RRC connection setup responses 120, such as an RRC connection setup message and/or an RRC reconfiguration message, to the UE 102. The base station 104 may send RRC connection setup responses 120 to the UE 102 before and/or after taking actions to set up the RRC connection at block 508. For example, the RRC connection setup responses 120 sent at block 510 can include an RRC connection setup message indicating that an SRB for the requested RRC connection has been set up, and/or other configuration data associated with the RRC connection. The base station 104 may also reserve and/or allocate resources for one or more DRBs associated with the RRC connection before or after sending the RRC connection setup message, and send an RRC reconfiguration message indicating information associated with the DRBs to the UE 102 at block 510. Accordingly, the RRC connection setup responses 120 sent at block 510 may indicate information about the RRC connection, such that the UE 102 can use the RRC connection. Thereafter, at block 512, the base station 104 can exchange XR application data 108 via the RRC connection, such as uplink XR application data 108 being sent by the UE 102 to the XR application server 106 and/or other UEs, and downlink XR application data 108 being sent by the XR application server 106 and/or other UEs to the UE 102.

Figure 6:
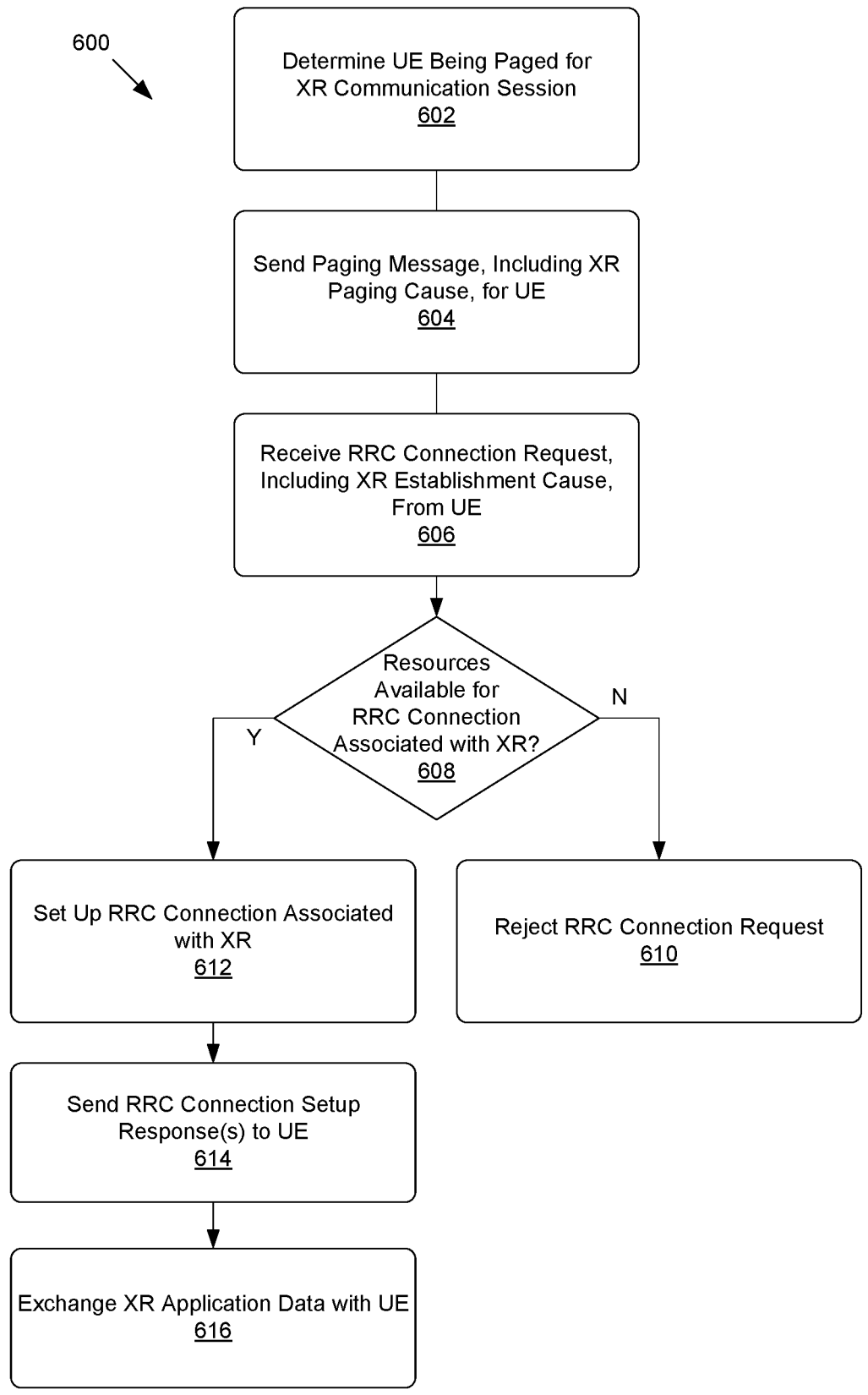
FIG. 6 shows a flowchart of an example method in which a base station can page a UE using an XR paging cause, and can respond to an RRC connection request that includes an XR establishment cause.

FIG. 6 shows a flowchart of an example method 600 in which the base station 104 can page the UE 102 using the XR paging cause 204, and can respond to the RRC connection request 118 that includes the XR establishment cause 122. In the example method 600, the UE 102 can be an MT device that responds to the paging message 202 that includes the XR paging cause 204.

At block 602, the base station 104 can determine that the UE 102 is to be paged for a communication session associated with an XR application. For example, the XR application server 106 or another UE may be attempting to invite the UE 102 to join a communication session associated with an XR application, and may send an invitation or other notification that causes an element of the core network 116 or another network element to instruct the base station 104 to page the UE 102 in association with the XR application.

At block 604, the base station 104 can accordingly send the paging message 202, including the XR paging cause 204, for the UE 102. For example, a portion of the paging message 202 can be addressed to the UE 102 or otherwise indicates an identifier, such as a P-RNTI, of the UE 102. The portion of the paging message 202 associated with the UE 102 can include the XR paging cause 204, which can signify to the UE 102 that the UE 102 is being paged in association with an XR application.

The UE 102 can respond to the paging message 202 that includes the XR paging cause 204 by sending the RRC connection request 118, including the XR establishment cause 122, to the base station 104. Accordingly, at block 606, the base station 104 can receive the RRC connection request 118, including the XR establishment cause 122, from the UE 102.

At block 608, the base station 104 can determine whether the base station 104 has resources available that could be allocated for an RRC connection associated with an XR application. For example, the XR configuration 308 of the base station 104 may indicate types of bearers to set up for XR applications that may be most likely to meet target goals for XR applications, frequency bands and/or carrier configurations that may be most likely to meet target goals for XR applications, a QoS flow identifier associated with XR applications, and/or other types of resources that the base station 104 is configured to allocate to increase the likelihood of meeting target goals for XR applications. At block 608, the base station 104 can determine whether or not such resources are currently available that could be allocated to the requested RRC connection.

If the base station 104 determines that insufficient resources are available for an RRC connection associated with an XR application (Block 608—No), for instance if the base station 104 is under a relatively heavy load and remaining available resources are unlikely to meet target goals for XR applications, or if signal-to-noise and/or other metrics indicate that the base station 104 would be unable to exchange data with the UE 102 in compliance with target goals for XR applications, the base station 104 may reject the RRC connection request 118 at block 610. For example, the base station 104 may send an RRC connection setup response 120 to the UE 102 that rejects the RRC connection request 118, and/or that instructs the UE 102 to retry the RRC connection request 118 with a different base station or with the base station 104 at a later point in time when the base station 104 may have more resources available.

However, if the base station 104 determines that sufficient resources are available for an RRC connection associated with an XR application (Block 608—Yes), the base station 104 can reserve those resources and/or use the resources to set up the requested RRC connection for the UE 102 at block 612. For example, the base station 104 can use the XR configuration 308 to set up types of bearers that may be most likely to meet target goals for XR applications, allocate resources of frequency bands and/or carrier configurations that may be most likely to meet target goals for XR applications, set up a QoS flow associated with XR applications, and/or allocate other types of resources that may increase the likelihood of meeting target goals for XR applications.

At block 614, the base station 104 can send one or more RRC connection setup responses 120, such as an RRC connection setup message and/or an RRC reconfiguration message, to the UE 102. The base station 104 may send RRC connection setup responses 120 to the UE 102 before and/or after taking actions to set up the RRC connection at block 612. For example, the RRC connection setup responses 120 sent at block 614 can include an RRC connection setup message indicating that an SRB for the requested RRC connection has been set up, and/or other configuration data associated with the RRC connection. The base station 104 may also reserve and/or allocate resources for one or more DRBs associated with the RRC connection before or after sending the RRC connection setup message, and send an RRC reconfiguration message indicating information associated with the DRBs to the UE 102 at block 614. Accordingly, the RRC connection setup responses 120 sent at block 614 may indicate information about the RRC connection, such that the UE 102 can use the RRC connection. Thereafter, at block 616, the base station 104 can exchange XR application data 108 via the RRC connection, such as uplink XR application data 108 being sent by the UE 102 to the XR application server 106 and/or other UEs, and downlink XR application data 108 being sent by the XR application server 106 and/or other UEs to the UE 102.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:

receiving, by a base station of a telecommunication network, a Radio Resource Control (RRC) connection request from a user equipment (UE);

determining, by the base station, that the RRC connection request indicates an Extended Reality (XR) establishment cause, wherein the XR establishment cause indicates that the UE is requesting an RRC connection for a communication session associated with an XR application; and setting up, by the base station, the RRC connection in response to the RRC connection request, by at least of establishing one or more bearers, or allocating resources, associated with one or more target goals for XR applications, wherein the XR establishment cause is a different establishment case than an emergency establishment cause, a high priority access establishment cause, a data establishment cause, a voice call establishment cause, a video call establishment cause, and a short message service establishment cause.

2. The method of claim 1, further comprising:

sending or receiving, by the base station, XR application data associated with the XR application via the one or more bearers or resources, wherein the XR application data includes at least one of sensor data, image data, or audio data.

3. The method of claim 2, wherein the one or more target goals for XR applications include latency goals and throughput goals associated with transmission of the XR application data.

4. The method of claim 1, wherein the XR application is at least one of a virtual reality (VR) application, an augmented reality (AR) application, or a mixed reality (MR) application.

5. The method of claim 1, wherein the XR establishment cause is a value, of an establishment cause field of the RRC connection request, that corresponds with the XR applications.

6. The method of claim 5, wherein the value indicates that the UE is a mobile originating device that is initiating the communication session associated with the XR application.

7. The method of claim 5, wherein the value indicates that the UE is a mobile terminating device that is responding to a paging message that includes an XR paging cause.

8. The method of claim 1, further comprising:

receiving, by the base station, a notification that an XR application server or a second UE is attempting to communicate with the UE via the XR application; and sending, by the base station in response to the notification, a paging message indicating an identifier of the UE and an XR paging cause, wherein the base station receives the RRC connection request including the XR establishment cause from the UE in response to the paging message.

9. The method of claim 8, wherein the XR paging cause is a value, of a paging cause field of the paging message, that corresponds with the XR applications.

10. The method of claim 1, further comprising:

receiving, by the base station, a second RRC connection request from a second UE;

determining, by the base station, that the second RRC connection request indicates the XR establishment cause;

determining, by the base station, that the base station has insufficient resources to meet the one or more target goals for XR applications; and sending, by the base station in response to determining that the base station has insufficient resources, a rejection of the second RRC connection request to the second UE.

11. A base station of a telecommunication network, comprising:

one or more processors, and memory storing computer-executable instructions that, when executed by the one or more processors, cause the one or more processors to perform operations comprising:

receiving a Radio Resource Control (RRC) connection request from a user equipment (UE);

determining that the RRC connection request indicates an Extended Reality (XR) establishment cause, wherein the XR establishment cause indicates that the UE is requesting an RRC connection for a communication session associated with an XR application; and setting up the RRC connection in response to the RRC connection request, by at least of establishing one or more bearers, or allocating resources, associated with one or more target goals for XR applications, wherein the XR establishment cause is a different establishment case than an emergency establishment cause, a high priority access establishment cause, a data establishment cause, a voice call establishment cause, a video call establishment cause, and a short message service establishment cause.

12. The base station of claim 11, wherein the one or more target goals for XR applications include latency goals and throughput goals.

13. The base station of claim 11, wherein the XR establishment cause is a value, of an establishment cause field of the RRC connection request, that corresponds with the XR applications.

14. The base station of claim 13, wherein the value indicates that the UE is a mobile originating device that is initiating the communication session associated with the XR application.

15. The base station of claim 13, wherein the value indicates that the UE is a mobile terminating device that is responding to a paging message that includes an XR paging cause.

16. The base station of claim 11, wherein the operations further comprise:

receiving a notification that an XR application server or a second UE is attempting to communicate with the UE via the XR application; and sending, in response to the notification, a paging message indicating an identifier of the UE and an XR paging cause, wherein the base station receives the RRC connection request including the XR establishment cause from the UE in response to the paging message.

17. One or more non-transitory computer-readable media storing computer-executable instructions that, when executed by one or more processors of a base station of a telecommunication network, cause the base station to:

receive a Radio Resource Control (RRC) connection request from a user equipment (UE);

determine that the RRC connection request indicates an Extended Reality (XR) establishment cause, wherein the XR establishment cause indicates that the UE is requesting an RRC connection for a communication session associated with an XR application; and set up the RRC connection in response to the RRC connection request, by at least of establishing one or more bearers, or allocating resources, associated with one or more target goals for XR applications, wherein the XR establishment cause is a different establishment case than an emergency establishment cause, a high priority access establishment cause, a data establishment cause, a voice call establishment cause, a video call establishment cause, and a short message service establishment cause.

18. The one or more non-transitory computer-readable media of claim 17, wherein the one or more target goals for XR applications include latency goals and throughput goals.

19. The one or more non-transitory computer-readable media of claim 17, wherein the computer-executable instructions further cause the base station to:

receive a notification that an XR application server or a second UE is attempting to communicate with the UE via the XR application; and send, in response to the notification, a paging message indicating an identifier of the UE and an XR paging cause, wherein the base station receives the RRC connection request including the XR establishment cause from the UE in response to the paging message.

20. The one or more non-transitory computer-readable media of claim 17, wherein the computer-executable instructions further cause the base station to:

receive a second RRC connection request from a second UE;

determine that the second RRC connection request indicates the XR establishment cause;

determine that the base station has insufficient resources to meet the one or more target goals for XR applications; and send, in response to determining that the base station has insufficient resources, a rejection of the second RRC connection request to the second UE.

\* \* \* \* \*